United States Patent [19]

Carnevale

[11] Patent Number: 4,819,750
[45] Date of Patent: Apr. 11, 1989

[54] ELECTRONIC BATH SCALE

[75] Inventor: Francesco L. Carnevale, Waynesboro, Miss.

[73] Assignee: Sunbeam Corporation, Downers Grove, Ill.

[21] Appl. No.: 156,422

[22] Filed: Feb. 16, 1988

[51] Int. Cl.⁴ .................. G01G 21/08; G01G 5/04; G01G 3/14

[52] U.S. Cl. .................. 177/256; 177/208; 177/211

[58] Field of Search ............... 177/134, 208, 256, 211

[56] References Cited

U.S. PATENT DOCUMENTS 3,164,218 1/1965 McClimon ............... 177/208 X
3,464,509 9/1969 Gray ....................... 177/256 X
4,458,771 7/1984 Hanssen et al. ............... 177/256

Primary Examiner—George H. Miller, Jr.
Attorney, Agent, or Firm—Mason, Kolehainen, Rathburn & Wyss

[57] ABSTRACT

A bathroom platform scale is disclosed having a reinforced plastic base and platform. The platform is carried by a pair of triangular-shaped actuation levers which directly engage a single transducer, such as a strain gauge, centrally located in the base, to sense the weight on the platform. Such an arrangement allows for a relatively compact scale. The triangular-shaped levers are supported by knife edge bearings which define a fulcrum. An integrally formed tongue extending from an apex from each of the triangular-shaped levers applies the weight distributed on the platform to the transducer. The triangular-shaped actuation levers are also self-aligning, thus facilitating assembly of the scale.

24 Claims, 3 Drawing Sheets

ELECTRONIC BATH SCALE

BACKGROUND OF THE INVENTION

1. Technical Field

This invention relates to a weighing apparatus and in particular to a bathroom type platform scale with an electronic display having a reinforced plastic base and platform. Weight distributed on the platform is applied to a single transducer located in the center of the scale by way of a pair of triangular-shaped actuation levers having integrally formed tongues extending from an apex which directly engage the transducer and allow for a relatively compact scale.

2. Description of the Prior Art

Platform scales are known in the art. Examples of such platform scales are disclosed in U.S. Pat. Nos. 3,666,032; 3,835,946; 4,315,554; 4,078,624; 4,674,582; and U.S. Pat. No. Des. 281,235. Generally, such prior art scales utilize a transducer, such as a strain gauge, which is carried by the base of the scale to sense the weight on the platform. The downward vertical movement of the platform in response to a weight is applied to the transducer by various arrangements of levers which are in contact with the platform. Some known platform scales, such as disclosed in U.S. Pat. No. 4,315,554, utilize T-bar type actuation levers which are mechanically coupled together by a pair of parallel, spaced apart load struts. Such an arrangement contains a relatively large number of components. Accordingly, a considerable amount of assembly time is required because of the relatively large number of levers within the scale which must be properly aligned to accurately apply the weight on the platform to the transducer.

U.S. Pat. No. 3,835,946 to Mettler discloses a platform scale which includes a pair of actuation levers of unequal length. The actuation levers are disposed in the base of the scale and are arranged to engage a transducer, disposed along an edge of the base. Such an arrangement requires that the base and consequently the entire scale have a relatively large area.

Moreover, most bathroom type scales are generally adapted to measure weight up to about 300 pounds. In order to support that amount of weight, known platform scales, such as the ones disclosed in U.S. Pat. No. 3,666,032 to Maffia et al, have a metal platform and metal base. Such scales are relatively heavy and expensive to fabricate.

SUMMARY OF THE INVENTION

It is an object of the present invention to solve the problems associated with the prior art bathroom type platform scales.

It is also an object of the present invention to provide a platform scale which is compact and relatively easy to assemble.

It is another object of the present invention to provide a platform scale which includes relatively few parts.

It is another object of the present invention to provide a platform scale having actuation levers which are relatively easy to align.

It is yet another object of the present invention to provide a platform scale which is relatively lightweight.

Briefly, the present invention relates to a bathroom type platform scale. The platform includes a plurality of knife edge bearings for applying the weight distributed thereon to a pair of triangular-shaped levers which are carried by the base of the scale. Each triangular-shaped lever is formed with a downwardly turned tongue extending from an apex for engaging a single transducer, centrally located within the scale, to produce a signal representative of the weight on the platform. This arrangement allows for the scale to be made relatively compact. Knife edge bearings located in the base, support the pair of triangular-shaped levers to define a fulcrum. The triangular-shaped levers are self-aligning and consequently facilitate assembly of the scale, thus reducing the overall cost. The platform and base are comprised of reinforced plastic. Elongated metal bars are nested in channel-shaped recesses in the underside of the platform to increase the rigidity of the platform, while not overly increasing the weight of the scale.

BRIEF DESCRIPTION OF THE DRAWING

These and other objects and features of the present invention will become better understood from the following description with reference to the accompanying drawing in which.

DETAILED DESCRIPTION OF THE DRAWING

Figure 1:
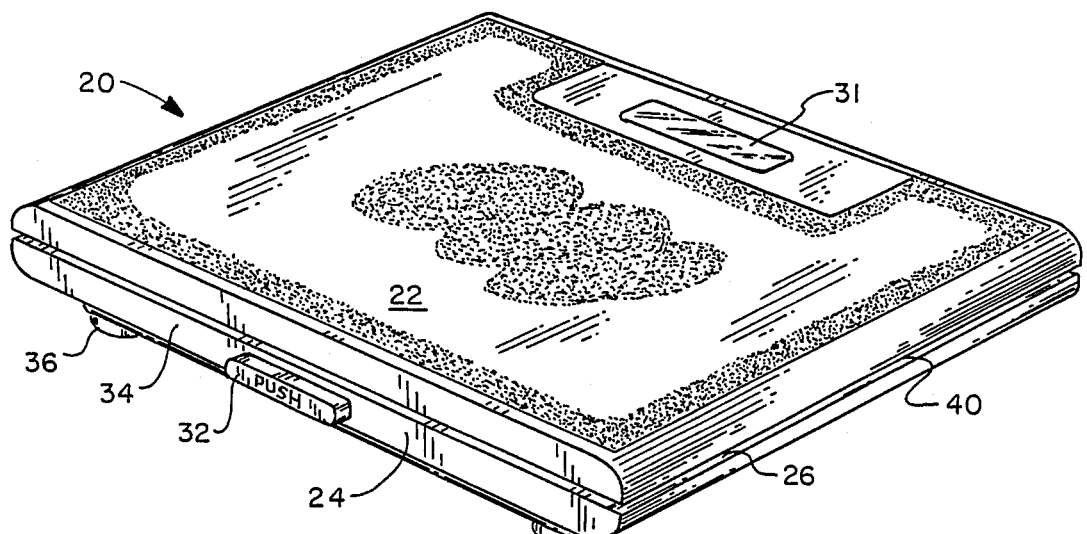
FIG. 1 is a perspective of the bathroom type platform scale in accordance with the present invention.
Figure 9:
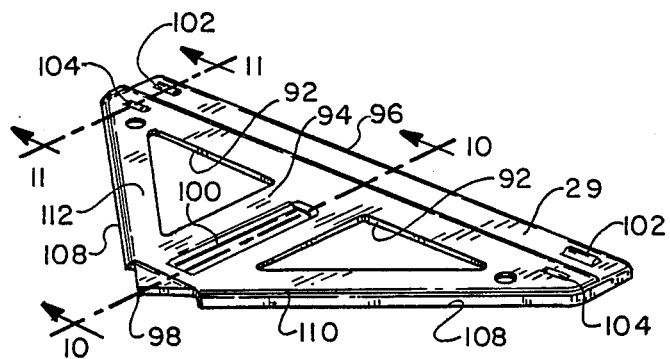
FIG. 9 is a perspective view of one of the triangular-shaped actuation lever in accordance with the present invention.
Figure 10:
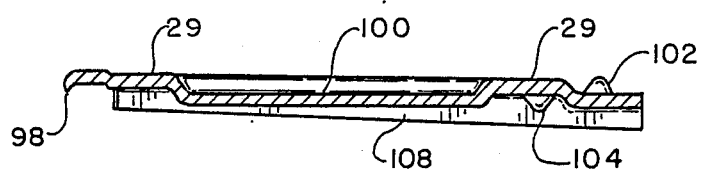
FIG. 10 is a sectional view of the actuation lever illustrated in FIG. 9 taken along line 10—10.

The present invention relates to a bathroom type platform scale having an electronic display, and is generally referred to by the reference numeral 20. Referring to FIG. 1, a platform scale 20 in accordance with the present invention is illustrated which includes a platform 22 and a base portion 24 which are fastened together such that the platform 22 and the base 24 are held in a spaced apart relationship defining a gap 26. When an operator stands on the scale 20, the weight of the operator is applied to a centrally located transducer 28 (FIG. 12) via a novel pair of triangular-shaped force collecting or actuation levers 29 (FIG. 9) for converting the weight on the platform 22 to an electronic signal which is applied to a display 30 which can be seen through a window 31 in the platform 22. A plunger 32, located on a side panel 34 of the base portion 24 of the scale 20, is used to activate the electronic circuitry (not shown) which zeroes the scale.

Four legs 36 are provided on the underside of the base 24. Each leg 36 is disposed proximate to a corner of the base 24. As best illustrated in FIG. 1, each leg has a circular cross-section. The legs 36 may be integrally molded or formed with the base 24. The legs 36 preferably have a relatively flat bottom surface and are covered with anti-skid material (not shown) to prevent the scale 20 from sliding on the floor. The anti-skid material may be secured to the bottom surface of the legs 36 by way of any known adhesive.

One unique aspect of the present invention relates to the relatively light weight of the scale 20. This is due to the fact that the platform portion 22 and the base portion 24 are made of reinforced plastic. The top surface of the platform 22 may be molded to be relatively smooth or may be textured to increase the friction coefficient. The bottom surface of the platform 22 is formed with a plurality of plastic reinforcing ribs 38. The plastic reinforcing ribs 38 are parallel to the edges 40 of the platform 22 and intersect generally perpendicular to each other defining a plurality of square cavities 42. The plastic reinforcing ribs 38 are preferably integrally formed with the platform 22. In addition to the plastic reinforcing ribs 38, the platform 22 may also be reinforced with one or more elongated metal reinforcement bars 44. The metal reinforcement bars 44 are nested among the plastic reinforcing ribs 38 to optimize the strength of the platform 22. The reinforcement bars 44 are received into channels (not shown) which are integrally formed in the platform 22. The channels are sized so that the elongated metal reinforcement bars 44 snugly fit therein. A post 46 is disposed at each end of the channel. Each of the posts 46 has a threaded aperture (not shown) for receiving fasteners 48. Each of the fasteners 48 includes a washer 50 which overlaps a portion of the metal reinforcement bar 44 when the fastener 48 is secured to the post 46 to capture the elongated metal reinforcement bar 44.

Figure 2:
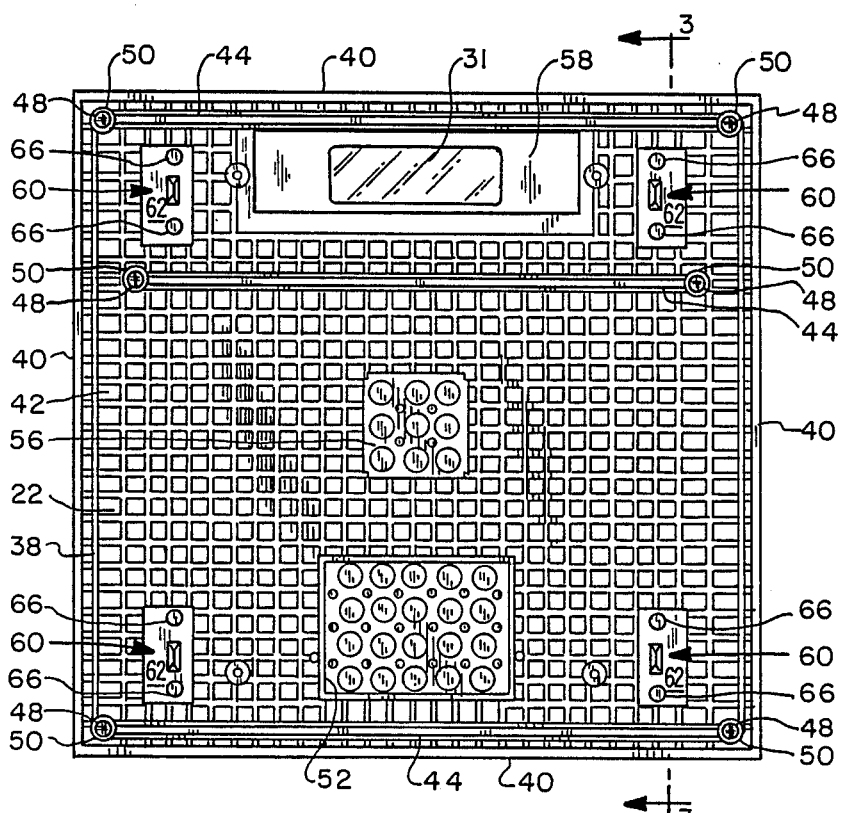
FIG. 2 is a bottom plan view of the platform portion of the scale shown in FIG. 1.

FIG. 2 illustrates the use of three elongated metal reinforcement bars 44. However, more or fewer metal reinforcement bars can be used depending on the strength of the scale required which in turn depends upon the weight to be supported. The placement of the elongated metal reinforcement bars 44 depends on the location of various components which are either integrally formed or mounted on the base portion 24 of the scale 20. As shown, two metal reinforcement bars 44 are disposed proximate opposite edges 40 of the platform 22 while the third reinforcement bar 44 is disposed therebetween.

Figure 4:
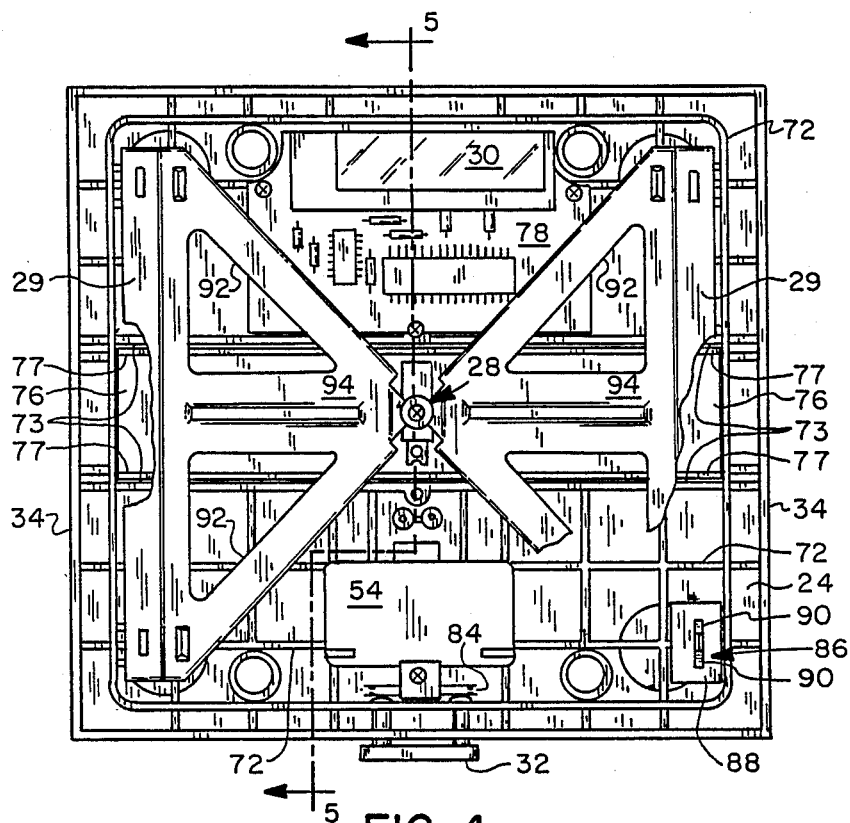
FIG. 4 is a plan view of the bathroom type platform scale in accordance with the present invention with the platform and a portion of one of the actuation levers removed.
Figure 5:
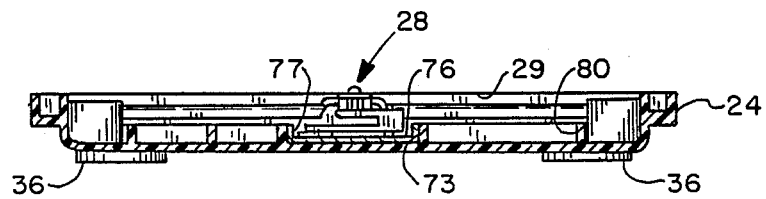
FIG. 5 is a sectional view of the scale illustrated in FIG. 4 taken along line 5—5.

The platform 22 may be molded with cavities in the underside to provide clearance for components or structures carried by the base 24. For example, as shown in FIG. 2, a battery cavity 52 is molded into the platform 22 for receiving and providing clearance for a battery compartment 54 (FIG. 4) which is integrally molded into the base portion 22. Another cavity 56 (FIG. 2) provides vertical clearance for the transducer 28 which is carried by the base section 22. By providing such clearance in the platform 22, the overall height of the scale 20 is minimized. Accordingly, since the transducer 28 is generally the largest component in the scale, the vertical height of the entire scale is controlled largely by the height of the transducer, thus reducing the overall height of the scale.

To allow vertical clearance in the platform 22, the thickness of the plastic reinforcing ribs 38 in the platform 22 is reduced. Consequently, it is necessary to provide a reinforcement geometry in such cavity portions which is essentially able to support a force relatively equivalent force to the force that can be supported by the rest of the platform 22. Accordingly, as shown in FIG. 2, the cavities 52 and 56 are provided with an array of circular cavities integrally formed in the platform 22. Such an array provides support for that portion of the platform 22 which is relatively equivalent to the rest of the platform.

Another cavity 58 is disposed along one edge 40 of the platform 22 to receive the display 30. Reinforcing structure is not provided in this cavity 58 since it is unlikely that this portion of the platform 22 will be required to support any weight.

Figure 7:
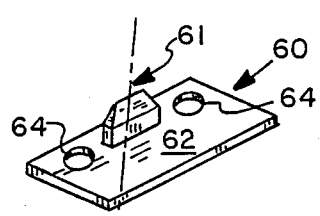
FIG. 7 is a perspective view of a knife edge bearing shown in FIG. 1 which is fastened to the underside of the platform.
Figure 8:
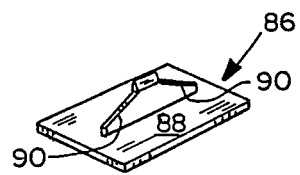
FIG. 8 is a perspective view of a knife edge bearing shown in FIG. 4 carried by the base.

The platform 22 is supported by a plurality of knife edge bearings 60 (FIGS. 2 and 7) which are rigidly attached to the underside of the platform so that the longitudinal axis 61 of the knife edges 60 are essentially perpendicular to the plane of the platform 22. Since the knife edges 60 are equally spaced from the edges 40 of the platform 22 any weight on the platform 22 will be relatively equally distributed. As best shown in FIG. 7, the knife edge 60 is carried by a plate 62. The plate 62 has a pair of apertures 64 which are received by a pair of posts 66 integrally molded in the underside of the platform 22. After the posts 66 are received through the apertures 64, the posts 66 are deformed, for example, by ultrasonic welding, to form a cap to secure the plate 62 to the underside of the platform 22. The knife edges 60 are supported on the triangular-shaped actuation levers 29 which communicate with the transducer 28 to concentrate the weight on the platform 22 at the transducer 28.

Figure 3:
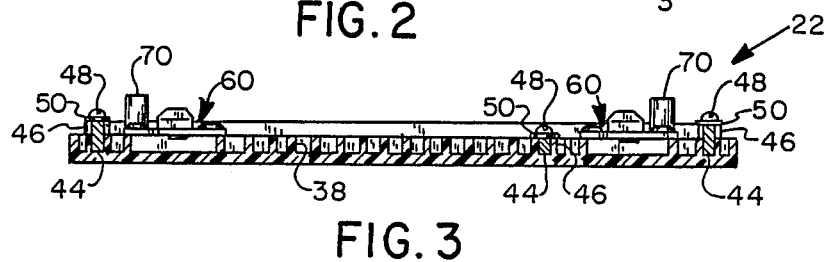
FIG. 3 is a sectional view of the platform portion of the scale of FIG. 2 taken along line 3—3.

The platform 22 is also provided with a plurality of posts 70 which are used to couple the platform 22 to the base 24. As shown best in FIGS. 3 and 6, the posts 70 are relatively long compared with the width of the platform 22 so as to extend through the base 24 as will be discussed in detail below.

The base 24 is formed from plastic having a plurality of integrally formed ribs 72. An elongated channel 73 is formed in the central portion of the base 24 and essentially extends between the two opposing ribs 72 which are spaced inwardly from and adjacent to side panels 34 in the base 24. An elongated rectangular plate 76 having integrally formed side walls 77 forms a U-shaped member which securely fits between the walls of the elongated channel 73. The transducer 28 (FIG. 12) is carried by the plate 76. The plate 76 is used to provide support for the transducer 28 since all of the force of the scale will be concentrated at the transducer 28.

The transducer 28 is electrically coupled to electronic circuitry disposed on a printed circuit board 78 which is carried by the base 24. The printed circuit board 78 also is electrically coupled to the electronic display 30. The electronic circuitry, while not critical to the practice of the instant invention, essentially converts the signal from the transducer 28, which may be a strain gauge, to an electronic signal representative of the weight on the platform for display on the display 30.

The printed circuit board 78 is disposed within an integrally formed cavity 80 formed in the base 24. The display 30 is mounted above the printed circuit board 78 and is received in a cavity 58 (FIG. 2) in the platform 22 and aligned with the platform 22 such that the display 30 is viewable through the viewing window 31. This arrangement allows the display 30 to be mounted such that it does not interfere with the free movement of the platform 22 with respect to the base 24.

The battery compartment 54, integrally formed into the base 24, is adapted to receive one or more batteries (not shown) which are used to supply electrical power to the electronic circuitry. The battery compartment 54 is received into a cavity 52 integrally molded into the underside of the platform 22. The printed circuit board 78 and the battery compartment 54 are electrically coupled to a normally open pair of electrical contacts 84. The contacts 84 are actuable by the plunger 32 which is mounted exterior to the base 24. When the plunger 32 is depressed, the contacts 84 are closed and the scale 20 is zeroed. After the scale 20 is zeroed, the scale 20 is then ready to display the weight of the person standing on the platform 22.

Knife edge supports 86 are disposed proximate each corner of the base 24. The knife edge supports 86 are inserted through an aperture (not shown) in a plate 88 such that a tongue (not shown) extends beneath the plane of the support plate 88 and is received in a slot integrally molded in the base 24 for securing the knife edge support 86 in place. The knife edge support 86 has oppositely extending arms 90 which prevent the knife edge support 86 from pivoting. The knife edge support 86 together with the mounting plate 88 and integrally formed mounting slots in the base 24 provide for a relatively easy assembly of the knife edge supports 86 to the base 24.

An important aspect of the invention relates to the actuation levers 29 which are used to concentrate the weight on the platform at the transducer 28. Each actuation lever 29 is triangular in shape and is integrally formed from relatively heavy gauge steel and capable of supporting a maximum of about 300 pounds. In order to reduce the overall weight of each actuation lever 29, oppositely disposed triangular apertures 92 are provided. The oppositely disposed apertures 92 define a center leg 94 which extends from a fulcrum portion 96 of the actuation lever 29 to a downwardly extending tongue 98 which communicates with the transducer 28. The center leg 94 may be formed with a rib 100 for additional rigidity to prevent flexure.

Figure 11:
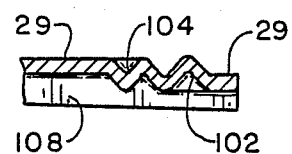
FIG. 11 is a sectional view of the actuation lever illustrated in FIG. 9 taken along line 11—11.

The fulcrum portion 96 comprises one leg of the actuation lever 29. The fulcrum portion 96 is provided with two pairs of integrally formed indentations 102 and 104. One pair of indentations 102, closest to the outer edge of the fulcrum portion 96, is formed on the underside of the actuation lever 29 and is adapted to receive the knife edge supports 86 carried by the base 24. Another pair of indentations 104 is disposed adjacent the indentations 102 and formed on the top side of the actuation lever 29. The indentations 104 are adapted to receive the knife edge supports 60 which are carried by the platform 22. The pairs of indentations 102 and 104, when in engagement with the respective knife edges supports 60 and 86, respectively, define a pivot axis along an edge of the base 24 in which the actuation levers 29 operates. Specifically, weight on the platform is applied at 104 causing the lever 29 to rotate about the fulcrum or pivot axis at 102. As best shown in FIG. 11, an edge of the fulcrum portion 96 is bent downwardly such that when the knife edge supports 60 and 86 engage the actuation lever 29 the knife edges 60 will be at approximately at the same plane. A lip 108 may be formed along oppositely disposed legs 110 and 112 of the actuation lever 29 for additional reinforcement. The above-described arrangement provides for self-alignment of the actuation levers 29 with respect to the knife edge supports 60 and 86 and consequently, greatly facilitates assembly of the scale 20.

An important aspect of the invention relates to the means in which the actuation levers 29 engage the transducer 28. Specifically, each actuation lever 29 includes a downwardly turned tongue 98 integrally formed at one apex. The tongues 98 directly engage the transducer 29, which is centrally located within the base 24. The transducer 29 includes a pair of oppositely disposed actuation areas 99 for receiving the tongues 98. By utilizing a single transducer centrally located within the base and allowing the actuation levers 29 to directly engage the transducer, the scale 20 can be made more compact. In some known platform scales, the transducer is located along one edge of the base which increases the overall size of the scale.

Figure 6:
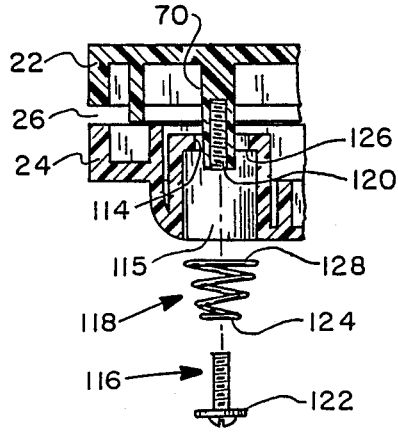
FIG. 6 is enlarged fragmentary sectional view of a corner portion of the scale in FIG. 1 illustrating how the platform and base sections are fastened together.

The mechanical coupling of the platform 22 to the base 24 includes a plurality of posts 70 integrally molded into the platform 22 which are received in apertures 114 in base 22. The apertures 114 are formed in a pocket 115 on the bottom side of the base 24 as shown in FIG. 6. A fastener 116 and a spring 118 are used to secure the post 70 to the base 24. More specifically, the spring 118 is inserted around the post 70 after it has been inserted through the aperture 114. A fastener 116 is then screwed into a threaded bore 120 in the post 70. The fastener includes a washer 122, which may be integrally formed with the fastener 116, which captures the spring 118. As best shown in FIG. 6, the lowermost turn 124 of the spring 118 engages the washer 122 compressing the spring 118 against the end of the pocket 115. The top turn 128 of the spring 118 seats against the exterior wall portion 126 of the base 24. Since the bottom turn 124 of the spring 118 is captured by the post 70 of the platform 22, the platform 22 and base are fastened together via the spring 118. The spring force biases the platform 22 toward the base 24 to hold it in place, while minimizing the force against the transducer 28. The force of the spring 118 is accounted for by the electronic circuitry which, upon actuation of the plunger 32, adjusts the reading such that the weight of the platform 22 and the force of the spring 118 are eliminated from the reading.

The transducer 28 utilized to provide the signal representative of the weight on the platform 22 is preferably a strain gauge. Strain gauges are well known in the art. In general, strain gauges are devices which when deformed due to elongation have a variable resistance which is linear and proportional to the amount of elongation. The variation in resistance is then used to provide a signal representative of the weight on the platform 22.

Figure 12:
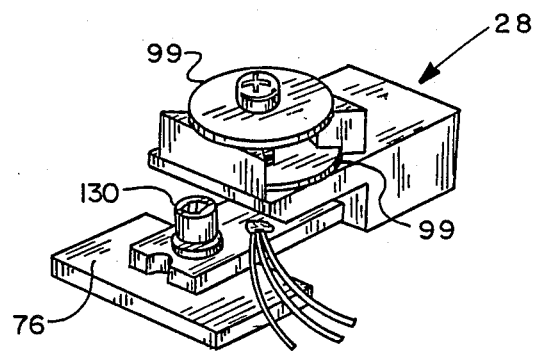
FIG. 12 is a perspective view of a transducer utilized in the present invention.

The strain gauge utilized in the present invention is preferably cantilever mounted as shown in FIG. 12 to the base plate 76 by way of a fastener 130. However, it will be realized by those of ordinary skill in the art that the principles of the present invention are not limited to the use of a strain gauge.

In operation, an operator stands in front of the scale and depresses the plunger 32 with his toe. After the system is initialized, the operator then stands on the platform 22 where after a predetermined time the operator's weight is displayed on the display 30.

It should be apparent that an improved bathroom type platform scale has been disclosed which is compact, relatively easy to assemble and weighs considerably less than known bathroom scales made of metal. The system can be implemented in a number of ways, all of which are contemplated within the scope of the independent claims.

What is claimed and desired to be secured by Letters Patent of the United States is:

1. A platform scale comprising:
   a platform;
   a generally rectangular base defining four corners, mechanically coupled to said platform; and
   means disposed in said based for providing a signal representative of the weight on the platform including a transducer and a pair of actuation levers pivotally mounted and supported at said four corners within said base, defining fulcrums generally parallel to each other, wherein each of said actuation levers directly engages said transducer.

2. A platform scale as recited in claim 1 wherein said actuation levers are triangular in shape.

3. A platform scale as in claim 1 wherein each of said actuation levers are formed with a downwardly extending tongue at one apex for directly engaging said transducer.

4. A platform scale as in claim 1 wherein said platform and base are made of reinforced plastic.

5. A platform scale as in claim 1 wherein said platform includes one or more elongated metal bars for reinforcement.

6. A platform scale as in claim 5 wherein said metal bars are generally perpendicular to the fulcrums.

7. A platform scale as in claim 1 further including a metal plate carried by the base for supporting the weight applied to said signal providing means.

8. A platform scale as in claim 1 wherein said base includes a plurality of spaced apart bearings carried by the base and the platform for supporting said actuation levers and defining fulcrums.

9. A platform scale as in claim 8 wherein said bearings are knife edge bearings.

10. A platform scale as in claim 9 wherein one leg of each of said actuation levers is formed with a pair of spaced apart aligned indentations adapted to receive said knife edges to allow said actuation lever to pivot about said fulcrum.

11. A platform scale comprising:
    a platform;
    a base mechanically coupled to said platform; and
    means disposed in said base for providing a signal representative of the weight on the platform including a transducer and a pair of actuation levers pivotally mounted within said base, defining fulcrums generally parallel to each other wherein said actuation levers directly engage said transducer; and wherein said transducer is cantilever mounted approximately at the center of said base.

12. A platform scale as in claim 11 wherein said transducer includes a pair of actuation areas for receiving said actuation levers.

13. A thin platform scale comprising a molded plastic platform being generally rectangular in shape having a flat load receiving upper surface and a lower surface having integrally molded reinforcing ribs, a molded plastic base which is generally rectangular in shape defining four corners and substantially coextensive with said platform, a pair of force collecting levers each being mounted on said base for pivotal movement about one elongated edge of said base and supported at said four corners within said base, each said lever having an apex positioned near the center of said base, a single transducer at the center of said base and engaged by said apex of each lever and producing an output signal proportional to the load on said platform, metal inserts in said lower surface of said platform in engagement with said levers to support said platform and to apply forces on said levers pivoting said levers about said elongated edges, wherein said force collecting levers are triangular in shape.

14. A thin platform scale as recited in claim 13 wherein each of said force collecting levers are formed with a downwardly extending tongue at one apex for directly engaging said single transducer.

15. A platform scale comprising:
    a platform;
    a generally rectangular base defining four corners, mechanically coupled to said platform;
    a single transducer centrally located in said base for producing an output signal proportional to the weight on said platform;
    a pair of actuation levers, supported at said four corners within said base, for pivotal movement about axes generally parallel to each other and disposed about opposite edges of said base for engaging said transducer; and
    a display electrically coupled to said transducer for displaying the amount of weight on the platform.

16. A platform scale as recited in claim 15 wherein said platform includes a plurality of posts extending downwardly from said platform and said base includes a corresponding number of aligned apertures for receiving said plurality of posts further including a plurality of springs disposed around said posts for biasing said base toward said platform forming the mechanical coupling therebetween.

17. A platform scale as recited in claim 15 wherein said actuation levers are symmetrically disposed within said base with respect to said transducer.

18. A platform scale as recited in claim 15 wherein said actuation levers are triangular in shape and define three apexes.

19. A platform scale as recited in claim 18 wherein one apex from each of said actuation levers engages said transducer.

20. A platform scale as recited in claim 19 wherein one apex is bent downwardly with respect to the plane of said actuation lever forming a tongue to engage said transducer.

21. A platform scale as recited in claim 20 further including means for self-aligning of said actuation levers with respect to said knife edge supports.

22. A platform sale as recited in claim 21 wherein said self-aligning means includes indentations formed in said levers.

23. A platform scale as recited in claim 15 wherein said base includes a plurality of spaced apart knife edge supports for pivotably supporting said actuation levers.

24. A platform scale having a platform, a base mechanically coupled thereto and means disposed in said scale including a transducer for providing a signal representative of the weight on the platform wherein the improvement comprises cavities formed in said platform and said base for receiving said signal providing means such that the height of said scale is approximately the height of said transducer.

* * * * *

UNITED STATES PATENT AND TRADEMARK OFFICE
CERTIFICATE OF CORRECTION

PATENT NO. : 4,819,750
DATED : April 11, 1989
INVENTOR(S) : CARNEVALE

It is certified that error appears in the above-identified patent and that said Letters Patent is hereby corrected as shown below:

Column 7, Line 11 "based" should be --base--.

Column 8, Line 53 "sale" should be --scale--.

Signed and Sealed this

Twentieth Day of March, 1990

Attest:

Attesting Officer

JEFFREY M. SAMUELS

Acting Commissioner of Patents and Trademarks